United States Patent
Hayashi et al.

(10) Patent No.: US 10,749,421 B2
(45) Date of Patent: Aug. 18, 2020

(54) ROTOR FOR IPM MOTOR, IPM MOTOR, AND METHOD OF MANUFACTURING THE ROTOR FOR IPM MOTOR

(71) Applicant: Mitsubishi Electric Corporation, Tokyo (JP)

(72) Inventors: Tomoki Hayashi, Tokyo (JP); Hironori Yabuuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/087,881

(22) PCT Filed: May 23, 2016

(86) PCT No.: PCT/JP2016/065186
§ 371 (c)(1),
(2) Date: Sep. 24, 2018

(87) PCT Pub. No.: WO2017/203570
PCT Pub. Date: Nov. 30, 2017

(65) Prior Publication Data
US 2019/0207442 A1 Jul. 4, 2019

(51) Int. Cl.
*H02K 29/08* (2006.01)
*H02K 15/03* (2006.01)
(Continued)

(52) U.S. Cl.
CPC ............ *H02K 29/08* (2013.01); *H02K 1/276* (2013.01); *H02K 11/215* (2016.01); *H02K 15/03* (2013.01); *H02K 21/12* (2013.01)

(58) Field of Classification Search
CPC ...... H02K 1/276; H02K 11/215; H02K 15/03; H02K 21/12; H02K 29/08
See application file for complete search history.

(56) References Cited

U.S. PATENT DOCUMENTS 4,604,665 A * 8/1986 Muller ................. G11B 17/038
310/67 R
2005/0215375 A1 9/2005 Kimura et al.

FOREIGN PATENT DOCUMENTS

EP 2477314 A1 * 7/2012
EP 2 667 491 A1 11/2013
(Continued)

OTHER PUBLICATIONS

International Search Report of the International Searching Authority dated Aug. 2, 2016 for the corresponding international application No. PCT/JP2016/065186 (and English translation).
(Continued)

*Primary Examiner* — Mohamad A Musleh
(74) *Attorney, Agent, or Firm* — Posz Law Group, PLC (57) ABSTRACT

Provided is a rotor for an IPM motor, including: a rotor core; permanent magnets embedded in the rotor core; a sensor magnet provided at one end of the rotor core; and a resin configured to fix the sensor magnet to the rotor core by covering the sensor magnet, wherein the sensor magnet includes: a base portion having an annular shape; and a plurality of projecting portions projecting toward the rotor core from a first surface, which is a surface of the base portion on a side opposed to the rotor core, and wherein the plurality of projecting portions each have a tapered portion on an inner periphery thereof, and are arranged at intervals on the first surface.

10 Claims, 7 Drawing Sheets

(51) Int. Cl.
*H02K 1/27* (2006.01)
*H02K 11/215* (2016.01)
*H02K 21/12* (2006.01)

(56) References Cited

FOREIGN PATENT DOCUMENTS

| JP | 2007-228736 A | 9/2007 |
|---|---|---|
| JP | 2013-207959 A | 10/2013 |

OTHER PUBLICATIONS

Extended European Search Report dated Apr. 26, 2019 issued in corresponding EP patent application No. 16903052.5.

\* cited by examiner

ROTOR FOR IPM MOTOR, IPM MOTOR, AND METHOD OF MANUFACTURING THE ROTOR FOR IPM MOTOR

CROSS REFERENCE TO RELATED APPLICATION

This application is a U.S. national stage application of International Application No. PCT/JP2016/065186, filed on May 23, 2016, the contents of which are incorporated herein by reference.

TECHNICAL FIELD

The present invention relates to a rotor for an interior permanent magnet motor, an interior permanent magnet motor, and a method of manufacturing the rotor for an interior permanent magnet motor, and more particularly, to a structure for mounting a sensor magnet to a rotor.

BACKGROUND

Hitherto, there has been known an interior permanent magnet motor including a rotor having permanent magnets embedded in a rotor core. In the following description, the interior permanent magnet motor is referred to as "IPM motor". The IPM motor is capable of obtaining reluctance torque in addition to magnetic torque generated by an attraction force and a repulsion force between a coil and permanent magnets. Therefore, as compared to a surface magnet motor including permanent magnets bonded to an outer peripheral surface of a rotor, the IPM motor achieves higher torque and higher efficiency. As the permanent magnets to be embedded in the rotor core of the IPM motor, there have typically been used sintered magnets such as rare-earth magnets, ferrite magnets, and alnico magnets.

The IPM motor typically includes an annular sensor magnet provided to the rotor, and a rotational position of the rotor is detected through detection of a magnetic force of the sensor magnet with a Hall sensor (Hall element). The sensor magnet described above is fixed to the rotor core, for example, through resin sealing at one end of the rotor core (for example, see Patent Literature 1).

PATENT LITERATURE

Patent Literature 1: Japanese Unexamined Patent Application Publication No. 2007-228736

When the sensor magnet is to be fixed to the rotor core through resin sealing of the sensor magnet at the one end of the rotor core, the rotor core and the sensor magnet are arranged in a mold, and a liquid resin is injected into a space between the rotor core and the mold and a space between the sensor magnet and the mold, and then the resin is cured. At this time, in the related-art IPM motor, the sensor magnet serves as a wall against the liquid resin flowing in the mold. Therefore, there is a problem that flowability of the liquid resin in the mold is degraded.

SUMMARY

The present invention has been made to solve the above-mentioned problem, and an object thereof is to obtain a rotor for an IPM motor, an IPM motor including the rotor, and a method of manufacturing the rotor, which are capable of improving flowability of a liquid resin in a mold when a sensor magnet is to be fixed to a rotor core through resin sealing.

According to one embodiment of the present invention, there is provided a rotor for an IPM motor, including: a rotor core; permanent magnets embedded in the rotor core; and a sensor magnet, which is provided at one end of the rotor core, and is fixed to the rotor core by being covered with a resin, wherein the sensor magnet includes: a base portion having an annular shape; and a plurality of projecting portions projecting toward the rotor core from a first surface, which is a surface of the base portion on a side opposed to the rotor core, and wherein the plurality of projecting portions each have a tapered portion on an inner periphery thereof, and are arranged at intervals on the first surface.

Further, according to one embodiment of the present invention, there is provided an IPM motor, including: the rotor for an IPM motor according to one embodiment of the present invention; and a stator arranged so as to cover an outer periphery of the rotor while being apart from the rotor with a preset clearance.

Further, according to one embodiment of the present invention, there is provided a method of manufacturing the rotor for an IPM motor, including: arranging the rotor core and the sensor magnet in a mold having an injection port; injecting a resin in a liquid state through the injection port and curing the resin; and fixing the sensor magnet to the rotor core through resin sealing of the sensor magnet at one end of the rotor core.

According to one embodiment of the present invention, the sensor magnet has the above-mentioned shape, thereby being capable of improving flowability of the liquid resin in the mold when the sensor magnet is to be fixed to the rotor core through resin sealing.

DETAILED DESCRIPTION

Embodiment

Figure 1:
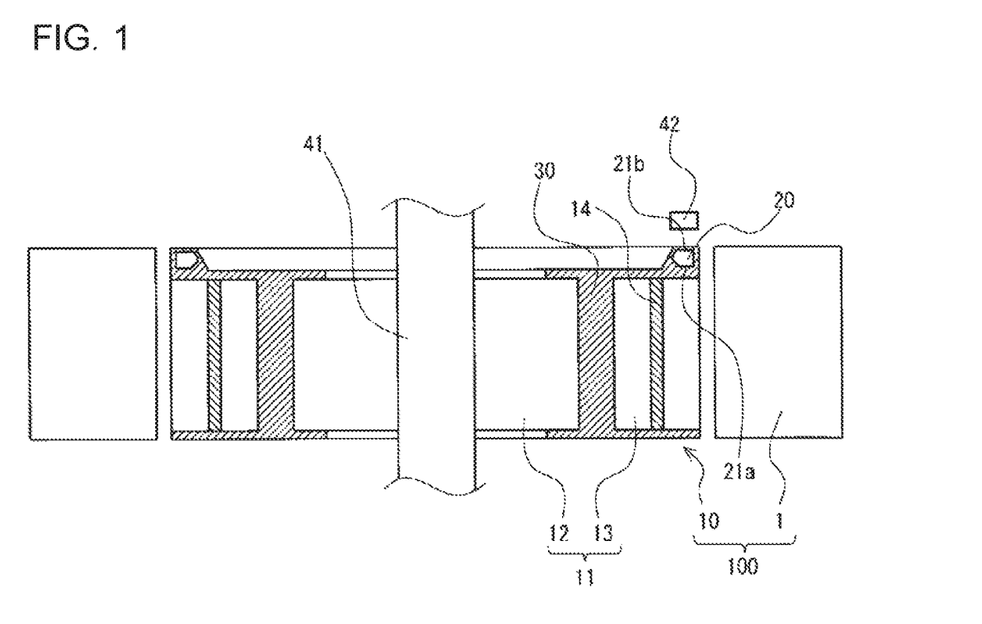
FIG. 1 is a schematic sectional view illustrating an IPM motor according to an embodiment of the present invention.

FIG. 1 is a schematic sectional view illustrating an IPM motor according to an embodiment of the present invention. In the schematic sectional views of FIG. 1 and other drawings described later, for easy understanding of shapes of components, only some components (permanent magnets 14, resin 30, and mold 50) among the components illustrated in cross section are illustrated with hatching.

The IPM motor 100 according to this embodiment includes a rotor 10 and a stator 1. The stator 1 is arranged so as to cover an outer periphery of the rotor 10 while being apart from the rotor 10 with a preset clearance.

The stator 1 includes a stator core and a coil. The stator core is formed, for example, by laminating a plurality of electromagnetic steel sheets. The coil is wound around teeth of the stator core. The stator 1 has, in a center portion thereof, a through hole passing through the stator 1 in a central axis direction. The rotor 10 is rotatably arranged in the through hole of the stator 1 while being apart from an inner peripheral surface of the through hole with a preset clearance.

The rotor 10 includes a rotor core 11 and the permanent magnets 14. The rotor core 11 has a substantially cylindrical shape. The permanent magnets 14 are embedded in the rotor core 11. The rotor core 11 has, in a center portion thereof, a through hole passing through the rotor core 11 in the central axis direction. A rotary shaft 41 is mounted to the through hole of the stator 1, for example, by press-fitting. That is, a rotating magnetic field generated in the stator 1 through application of a current to the coil of the stator 1 causes the rotary shaft 41 to rotate together with the rotor core 11.

Moreover, the rotor 10 according to this embodiment includes a sensor magnet 20 provided at one end (upper end in FIG. 1) of the rotor core 11. That is, the IPM motor 100 according to this embodiment is capable of detecting a rotational position of the rotor 10 through detection of a magnetic force of the sensor magnet 20 with a Hall sensor 42 (Hall element).

The Hall sensor 42 and the rotary shaft 41 may be components of the IPM motor 100, or may be components of a device to which the IPM motor 100 is to be mounted.

Figure 2:
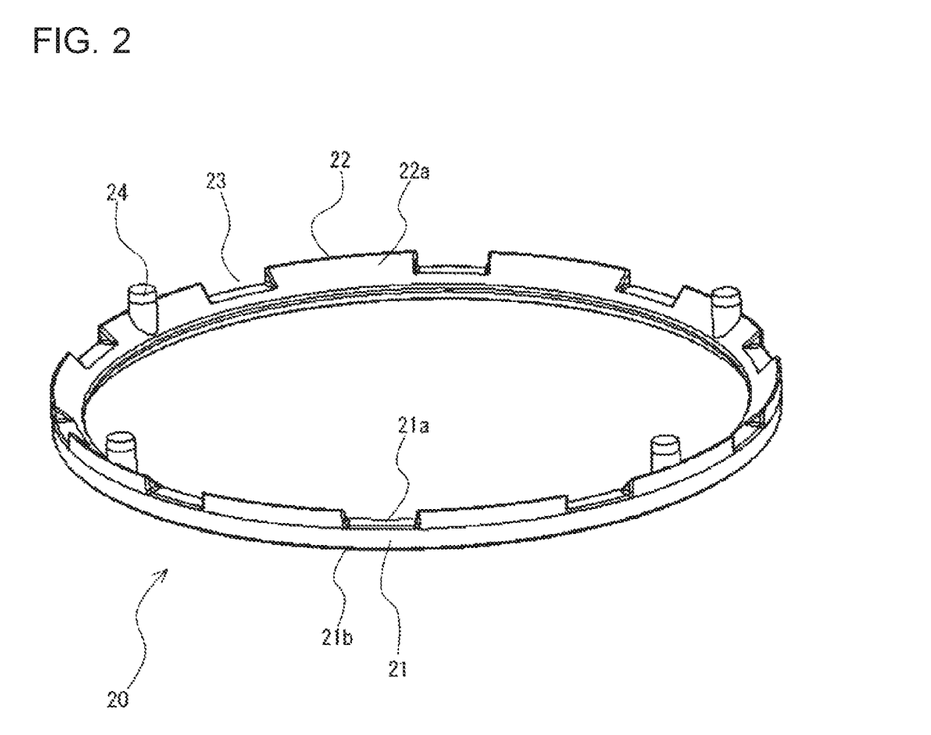
FIG. 2 is a perspective view illustrating a sensor magnet of the IPM motor according to the embodiment of the present invention.
Figure 3:
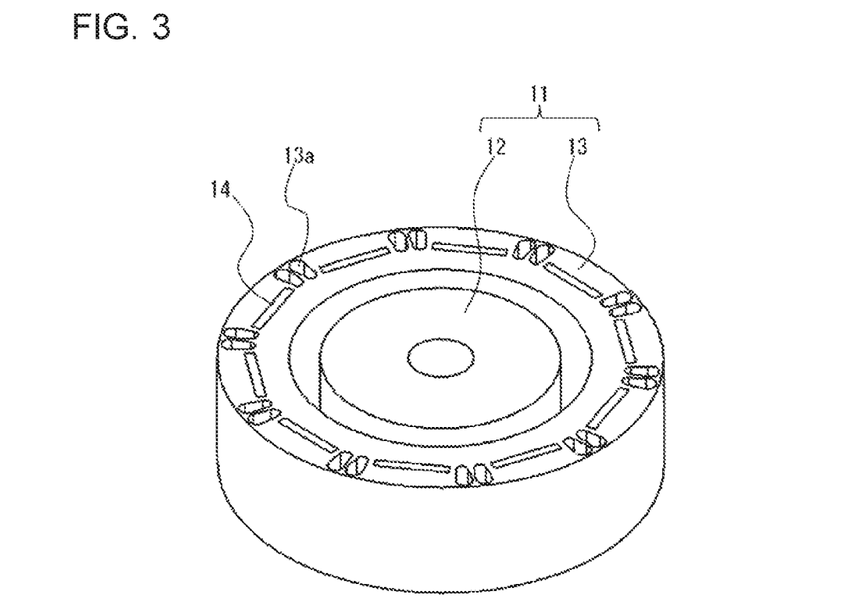
FIG. 3 is a perspective view illustrating a rotor core of the IPM motor according to the embodiment of the present invention.
Figure 4:
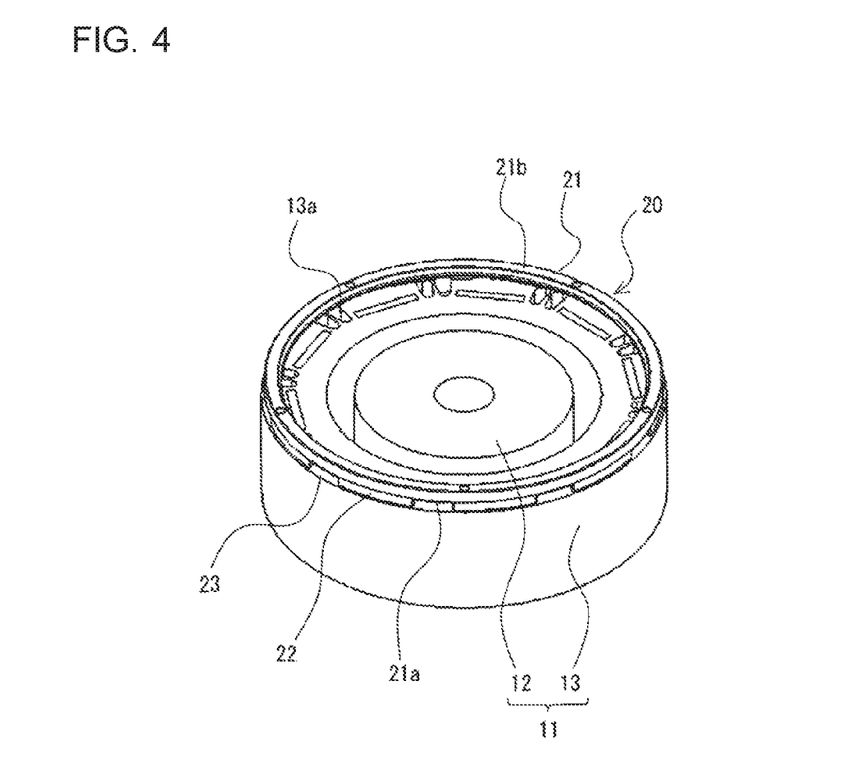
FIG. 4 is a perspective view illustrating a state in which the sensor magnet is mounted to the rotor core.

FIG. 2 is a perspective view illustrating the sensor magnet of the IPM motor according to the embodiment of the present invention. FIG. 3 is a perspective view illustrating the rotor core of the IPM motor according to the embodiment of the present invention. Moreover, FIG. 4 is a perspective view illustrating a state in which the sensor magnet is mounted to the rotor core in the IPM motor according to the embodiment of the present invention. Specifically, FIG. 2 is a perspective view illustrating the sensor magnet 20 as seen from the rotor core 11.

Now, with reference to FIG. 2 to FIG. 4 and FIG. 1 mentioned above, description is made of a detailed configuration of the rotor 10 according to this embodiment.

The rotor core 11 of the rotor 10 according to this embodiment includes an inner rotor core 12 and an outer rotor core 13.

The inner rotor core 12 has a substantially cylindrical shape, and is made of a resin. The inner rotor core 12 has, in a center portion thereof, a through hole passing through the inner rotor core 12 in the central axis direction. The rotary shaft 41 mentioned above is mounted to the through hole of the inner rotor core 12.

The outer rotor core 13 is formed by laminating a plurality of electromagnetic steel sheets. The outer rotor core 13 has, in a center portion thereof, a through hole passing through the outer rotor core 13 in the central axis direction. The inner rotor core 12 is arranged in the through hole of the outer rotor core 13. Moreover, the plurality of permanent magnets 14 are embedded in the outer rotor core 13 and arrayed at preset intervals in a circumferential direction. In this embodiment, rare-earth magnets are used as the permanent magnets 14. Moreover, the outer rotor core 13 has positioning holes 13a into which positioning pins 24, which are described later, of the sensor magnet 20 are inserted. The number of the positioning holes 13a is equal to or larger than the number of the positioning pins 24 of the sensor magnet 20. The positioning holes 13a pass through the outer rotor core 13 from one end to the other end of the outer rotor core 13 (in the up-and-down direction in FIG. 1).

The inner rotor core 12 and the outer rotor core 13 are fixed to each other (integrated with each other) by the resin 30 injected into a space defined therebetween. In this embodiment, the rare-earth magnets are used as the permanent magnets 14. The rare-earth magnets have a feature in that demagnetization occurs at high temperature. Therefore, in this embodiment, a thermoplastic resin which is cured by cooling is used as the resin 30. More specifically, in this embodiment, a polybutylene terephthalate (PBT) resin is used as the resin 30.

The resin 30 is not limited to the thermoplastic resin. For example, when ferrite magnets having a feature in that demagnetization occurs at low temperature are used as the permanent magnets 14, a thermosetting resin which is cured by heating may be used as the resin 30.

Moreover, although the inner rotor core 12 is made of a resin in this embodiment, as a matter of course, the inner rotor core 12 may be formed by laminating a plurality of electromagnetic steel sheets. Moreover, when the inner rotor core 12 is formed by laminating a plurality of electromagnetic steel sheets, the inner rotor core 12 and the outer rotor core 13 may be integrated with each other to form a single rotor core. With regard to the IPM motor 100 according to this embodiment, a required output (rotary force of the rotary shaft 41) is not large, and a strength required for the rotor core is also not large. Thus, the inner rotor core 12 made of a resin is used to achieve, improvement in electrical insulating property, reduction in weight, or the like.

The sensor magnet 20 is provided at one end (upper end in FIG. 1) of the outer rotor core 13. The sensor magnet 20 is fixed to the outer rotor core 13 by being covered with the resin 30. That is, the sensor magnet 20 is fixed to the outer rotor core 13 through resin sealing at the one end of the outer rotor core 13 with the resin 30.

The sensor magnet 20 includes a base portion 21 and a plurality of projecting portions 22. The base portion 21 has an annular shape. The plurality of projecting portions 22 are formed on the base portion 21. Specifically, the plurality of projecting portions 22 are arranged at preset intervals on a first surface 21a of the base portion 21, which is a surface on a side opposed to the outer rotor core 13. That is, the plurality of projecting portions 22 are projecting portions projecting toward the outer rotor core 13 from the first surface of the base portion 21. With this, recessed portions 23 are each formed between the projecting portions 22. Moreover, the projecting portions 22 each have, on an inner periphery thereof, a tapered portion 22a which is inclined toward an outer periphery as extending from the base portion 21 to the outer rotor core 13.

Moreover, in this embodiment, the number of the projecting portions 22, that is, the number of the recessed portions 23 is set equal to the number of the permanent magnets 14. In order to detect the rotational position of the rotor 10 through detection of the magnetic force of the sensor magnet 20 with the Hall sensor 42, it is required that the sensor magnet 20 be magnetized so as to alternately arrange N-poles and S-poles in the circumferential direction and that the number of the N-poles and the number of the S-poles be set equal to the number of the permanent magnets 14. In this regard, when the number of the projecting portions 22, that is, the number of the recessed portions 23 is set equal to the number of the permanent magnets 14, the number of the N-poles and the number of the S-poles can be set equal to the number of the permanent magnets 14 by magnetizing portions of the sensor magnet 20 corresponding to the projecting portions 22 to one of the N-pole and the S-pole and magnetizing portions of the sensor magnet 20 corresponding to the recessed portions 23 to an other one of the N-pole and the S-pole. With this configuration, the sensor magnet 20 can easily be manufactured.

Moreover, the sensor magnet 20 includes the positioning pins 24. Further, the sensor magnet 20 is fixed to the outer rotor core 13 under a state in which the positioning pins 24 are inserted into the positioning holes 13a of the outer rotor core 13. In this embodiment, the sensor magnet 20 includes four positioning pins 24 at the projecting portions 22. With the positioning pins 24, the sensor magnet 20 can easily be mounted to the outer rotor core 13 at a specified position. Moreover, with the plurality of positioning pins 24, the sensor magnet 20 can be prevented from shifting in the circumferential direction, thereby being capable of improving detection accuracy for the rotational position of the rotor 10. Moreover, when three or more positioning pins 24 are provided, at the time of performing resin sealing of the sensor magnet 20 with the resin 30, deformation of the sensor magnet 20 to the outer periphery by the resin pressure can also be prevented. Moreover, in the case in which three or more positioning pins 24 are provided, when the positioning pins 24 are arranged in an asymmetrical manner, the sensor magnet 20 can be prevented from being mounted to the outer rotor core 13 at an erroneous angular position, thereby being capable of preventing erroneous assembly of the rotor 10.

In this embodiment, a gap between the positioning pin 24 of the sensor magnet 20 and the positioning hole 13a of the outer rotor core 13 is defined as follows. In order to enable easy insertion of the positioning pin 24 into the positioning hole 13a and prevent the sensor magnet 20 from shifting in the circumferential direction, a slight gap is defined between the positioning pin 24 and a side surface of the positioning hole 13a on a circumferential side (side surface opposed to the positioning pin 24 in the circumferential direction). Moreover, in order to enable easy insertion of the positioning pin 24 into the positioning hole 13a and prevent deformation of the sensor magnet 20 toward the outer periphery by the resin pressure, a slight gap is defined between the positioning pin 24 and a side surface of the positioning hole 13a on an outer side (side surface at a position on the outer periphery of the outer rotor core 13). Moreover, in order to improve flowability of the resin 30 in the positioning hole 13a, a large gap is defined between the positioning pin 24 and a side surface of the positioning hole 13a on an inner side (side surface at a position on an inner periphery of the outer rotor core 13).

Next, description is made of a method of manufacturing the rotor 10.

Figure 5:
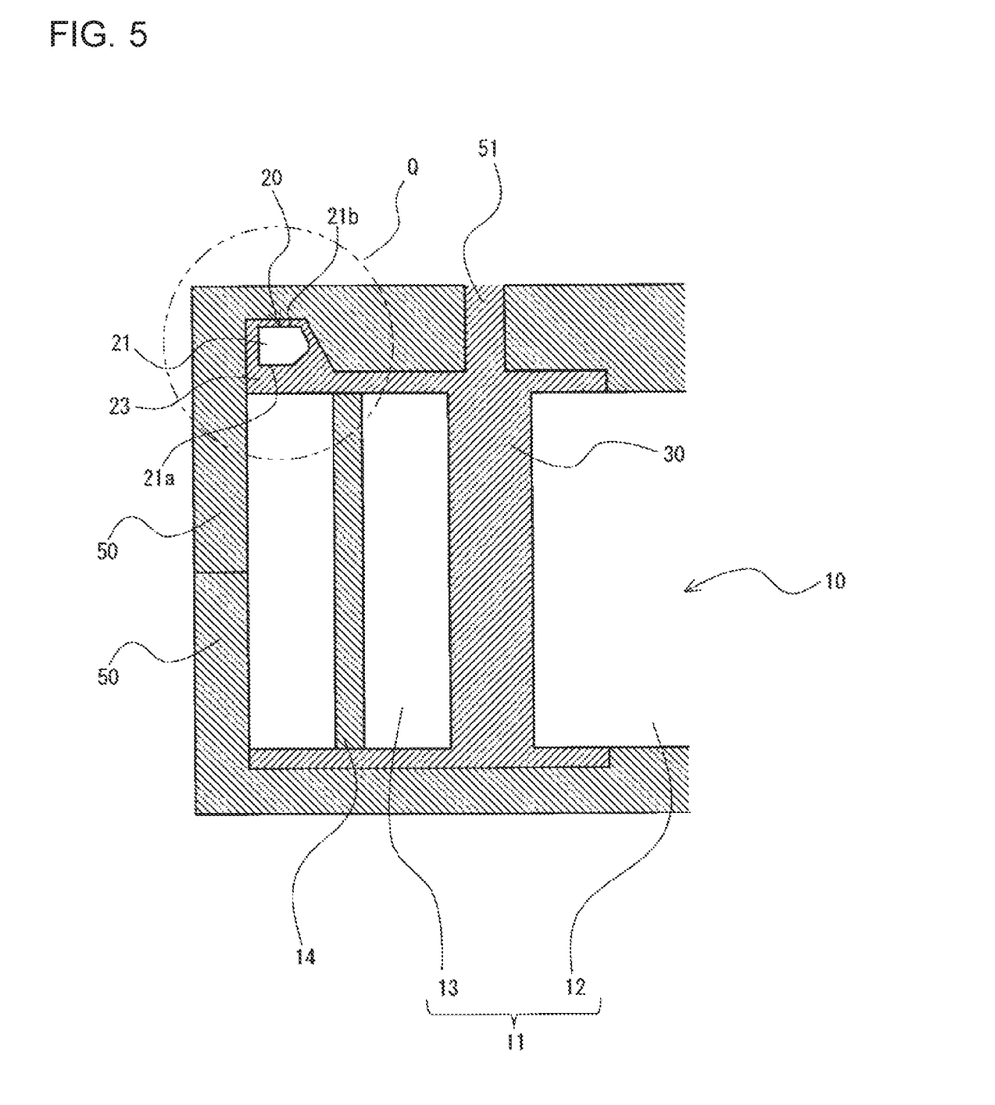
FIG. 5 is a schematic sectional view illustrating a state in which a rotor according to the embodiment of the present invention is arranged in a mold and in which a liquid resin is injected into the mold, and is a schematic sectional view taken along a central axis direction of the rotor at a position of a recessed portion of the sensor magnet.
Figure 6:
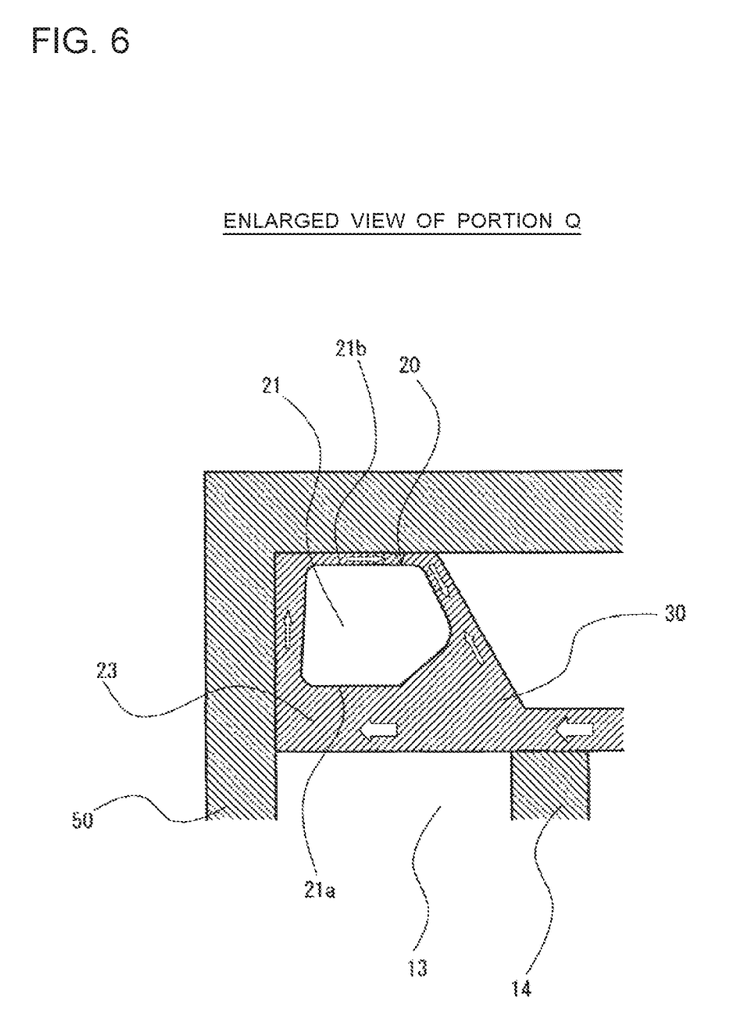
FIG. 6 is an enlarged view illustrating the portion Q of FIG. 5.
Figure 7:
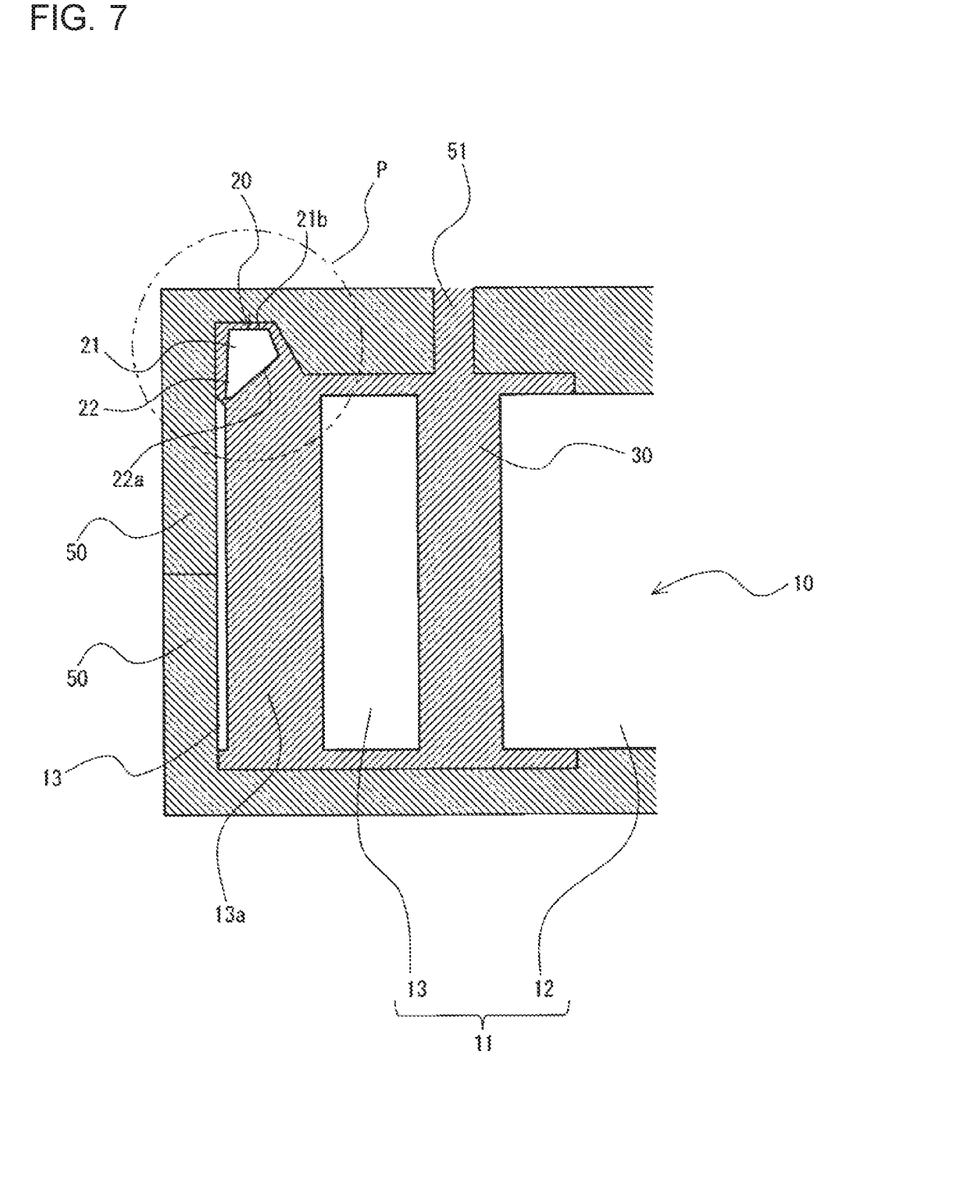
FIG. 7 is a schematic sectional view illustrating the state in which the rotor according to the embodiment of the present invention is arranged in the mold and in which the liquid resin is injected into the mold, and is a schematic sectional view taken along the central axis direction of the rotor at a position of a projecting portion of the sensor magnet.
Figure 8:
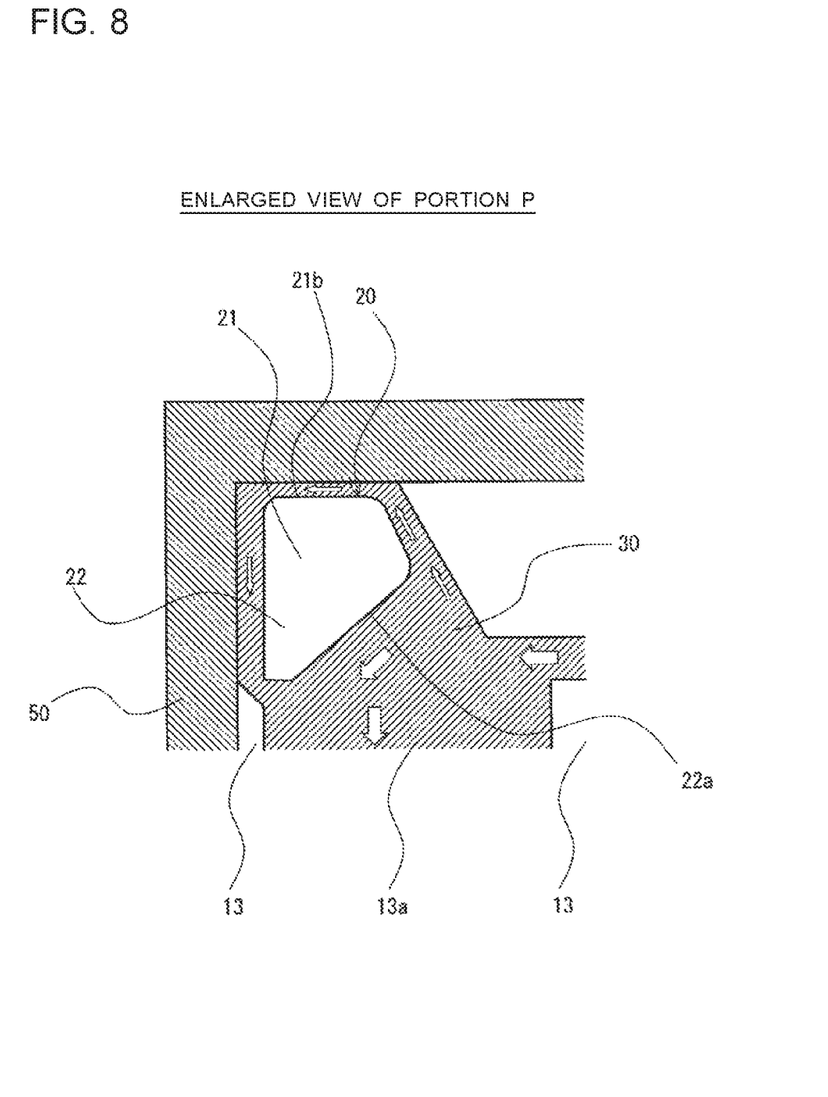
FIG. 8 is an enlarged view illustrating the portion P of FIG. 7.
Figure 9:
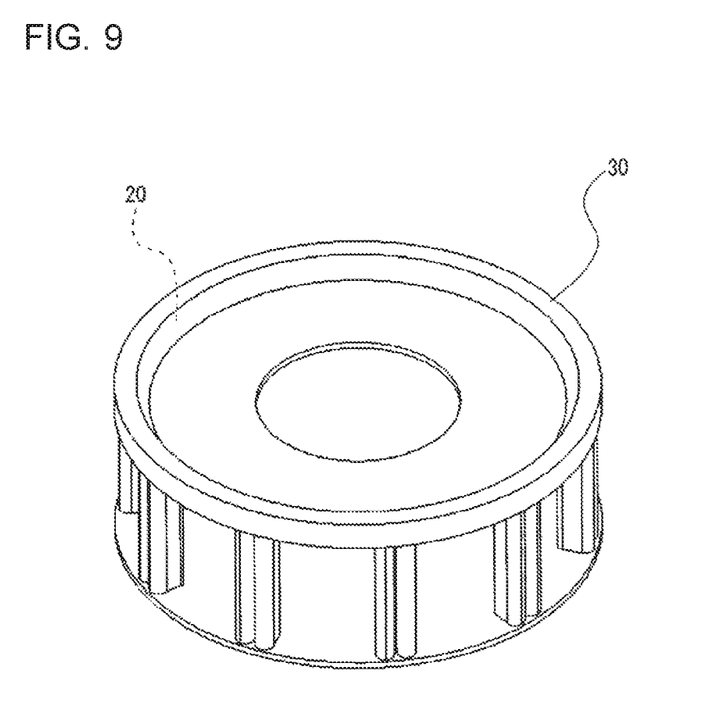
FIG. 9 is a perspective view illustrating a shape of the cured resin for the rotor according to the embodiment of the present invention.

FIG. 5 is a schematic sectional view illustrating a state in which the rotor according to the embodiment of the present invention is arranged in the mold and the liquid resin is injected into the mold, and is a schematic sectional view taken along the central axis direction of the rotor at the position of the recessed portion of the sensor magnet. FIG. 6 is an enlarged view illustrating the portion Q of FIG. 5. FIG. 7 is a schematic sectional view illustrating the state in which the rotor according to the embodiment of the present invention is arranged in the mold and the liquid resin is injected into the mold, and is a schematic sectional view taken along the central axis direction of the rotor at a position of the projecting portion of the sensor magnet. FIG. 8 is an enlarged view illustrating the portion P of FIG. 7. Moreover, FIG. 9 is a perspective view illustrating a shape of the cured resin for the rotor according to the embodiment of the present invention. The outlined arrows illustrated in FIG. 6 and FIG. 8 indicate flow directions of the resin 30.

In the following, description related to the up-and-down direction is made based on FIG. 5 to FIG. 9.

When the inner rotor core 12, the outer rotor core 13, and the sensor magnet 20 are to be fixed and integrated by the resin 30, first, those components are arranged in the mold 50. Specifically, the outer rotor core 13 having the permanent magnets 14 embedded therein is arranged in the mold 50. Moreover, in the mold 50, the inner rotor core 12 is arranged on the inner periphery of the outer rotor core 13. Moreover, the positioning pins 24 of the sensor magnet 20 are inserted into the positioning holes 13a of the outer rotor core 13 to arrange the sensor magnet 20 at an upper end of the outer rotor core 13 in the mold 50. The order of arrangement of the components is suitably selected.

After the inner rotor core 12, the outer rotor core 13, and the sensor magnet 20 are arranged in the mold 50, the resin 30 in a liquid state is injected into the mold 50 through an injection port 51 formed in the mold 50. The injection port 51 is formed at a position above the rotor 10 and on an inner periphery of the sensor magnet 20. Part of the resin 30 in the liquid state having been injected into the mold 50 passes through a gap defined between the inner rotor core 12 and the outer rotor core 13 and flows into a gap defined between a lower end of each of the inner rotor core 12 and the outer rotor core 13 (end portion on a side on which the sensor magnet 20 is not provided) and the mold 50, to thereby fill those gaps.

Moreover, part of the resin 30 in the liquid state having been injected into the mold 50 through the injection port 51 flows into a gap defined between an upper end of each of the inner rotor core 12 and the outer rotor core 13 (end portion on a side on which the sensor magnet 20 is provided) and the mold 50 to fill the gap, and thereafter flows to the outer periphery, that is, toward the sensor magnet 20. Then, the resin 30 in the liquid state having flowed toward the sensor magnet 20 covers the sensor magnet 20, thereby performing resin sealing of the sensor magnet 20.

In the related-art IPM motor in which the sensor magnet is fixed to the rotor core through resin sealing of the sensor magnet at one end of the rotor core, the sensor magnet serves as a wall against the liquid resin flowing in the mold. Therefore, there has been a case in which flowability of the liquid resin in the mold is degraded, which results in insufficient resin sealing. However, in this embodiment, the sensor magnet 20 has the above-mentioned shape. Thus, as illustrated in FIG. 5 to FIG. 8, the resin 30 in the liquid state flows in the vicinity of the sensor magnet 20, thereby being capable of preventing the insufficient resin sealing.

Specifically, under the state in which the sensor magnet 20 is arranged at the upper end of the outer rotor core 13, distal ends of the projecting portions 22 of the sensor magnet 20 abut the outer rotor core 13. Therefore, the recessed portion 23 of the sensor magnet 20 serves as a flow passage for the resin 30 in the liquid state, which allows communication between the inner periphery and the outer periphery of the sensor magnet 20. Therefore, as illustrated in FIG. 6, at the portion of the sensor magnet 20 corresponding to the recessed portion 23, the resin 30 in the liquid state flows from the inner periphery to the outer periphery of the sensor magnet 20 through the recessed portion 23. Then, the resin 30 in the liquid state flows into the upper side through the gap defined between the outer periphery of the sensor magnet 20 and the mold 50. That is, the resin 30 in the liquid state flows into a gap defined between a second surface 21b, which is formed on a side opposite to the first surface 21a of the base portion 21 (surface on a side opposed to the outer rotor core 13), and the mold 50. That is, at the portion of the sensor magnet 20 corresponding to the recessed portion 23, a flow of the resin 30 in the liquid state toward the upper side of the sensor magnet 20 is generated.

Meanwhile, as illustrated in FIG. 8, at the portion of the sensor magnet 20 corresponding to the projecting portion 22, the resin 30 in the liquid state having flowed toward the sensor magnet 20 is guided downward by the tapered portion 22a. Therefore, at the portion of the sensor magnet 20 corresponding to the projecting portion 22, the resin 30 in the liquid state having flowed in from the inner periphery of the sensor magnet 20 to the upper side of the sensor magnet 20 is drawn by the above-mentioned flow of the resin 30 to flow toward the lower side of the sensor magnet 20 through the outer periphery of the sensor magnet 20. That is, at the portion of the sensor magnet 20 corresponding to the projecting portion 22, a flow of the resin 30 in the liquid state toward the lower side of the sensor magnet 20 is generated. Thus, in this embodiment, flowability of the resin 30 in the liquid state in the periphery of the sensor magnet 20 is improved by the flow at the portion corresponding to the recessed portion 23 toward the upper side of the sensor magnet 20 and the flow at the portion corresponding to the projecting portion 22 toward the lower side of the sensor magnet 20. Thus, the resin 30 in the liquid state sufficiently flows to the periphery of the sensor magnet 20. Therefore, when the sensor magnet 20 is fixed to the outer rotor core 13 through curing of the resin 30, as illustrated in FIG. 9, occurrence of the resin sealing failure can be prevented.

As described above, in the rotor 10 and the IPM motor 100 according to this embodiment, the first surface 21a of the base portion 21 having an annular shape includes the projecting portions 22 and the recessed portions 23, and hence flowability of the resin 30 in the liquid state in the periphery of the sensor magnet 20 can be improved.

Moreover, in the rotor 10 and the IPM motor 100 according to this embodiment, the number of the projecting portions 22, that is, the number of the recessed portions 23 is set equal to the number of the permanent magnets 14, and hence the sensor magnet 20 can easily be manufactured.

Moreover, in the rotor 10 and the IPM motor 100 according to this embodiment, the sensor magnet 20 includes the positioning pins 24 to be inserted into the positioning holes 13a of the outer rotor core 13. Therefore, in the rotor 10 and the IPM motor 100 according to this embodiment, the sensor magnet 20 can easily be mounted to a specific position of the outer rotor core 13.

Moreover, in the rotor 10 and the IPM motor 100 according to this embodiment, the positioning holes 13a pass through the outer rotor core 13 from one end to an other end of the outer rotor core 13. Further, the positioning pins 24 of the sensor magnet 20 are provided on the projecting portions 22. Therefore, at the time of performing resin sealing, the resin 30 in the liquid state having flowed downward by the tapered portions 22a of the projecting portions 22 can pass through the positioning holes 13a to flow toward the lower end of the outer rotor core 13 (end portion on a side on which the sensor magnet 20 is not provided). Thus, the flow at the portion corresponding to the projecting portion 22 toward the lower end of the sensor magnet 20 can be promoted, thereby being capable of further improving flowability of the resin 30 in the liquid state in the periphery of the sensor magnet 20.

Moreover, in the rotor 10 and the IPM motor 100 according to this embodiment, the sensor magnet 20 includes three or more positioning pins 24. Therefore, in the rotor 10 and the IPM motor 100 according to this embodiment, when the sensor magnet 20 is to be subjected to resin sealing with the resin 30, deformation of the sensor magnet 20 toward the outer periphery by the resin pressure can also be prevented.

Moreover, in the rotor 10 and the IPM motor 100 according to this embodiment, the three or more positioning pins 24 are arranged in an asymmetrical manner. Thus, the sensor magnet 20 can be prevented from being mounted to the outer rotor core 13 at an erroneous angular position, thereby being capable of preventing erroneous assembly of the rotor 10.

The invention claimed is:

1. A rotor for an IPM motor, comprising:
   a rotor core;
   permanent magnets embedded in the rotor core; and
   a sensor magnet, which is provided at one end of the rotor core, and is fixed to the rotor core by being covered with a resin, wherein
   the sensor magnet includes:
      a base portion having an annular shape; and
      a plurality of projecting portions projecting toward the rotor core from a first surface, which is a surface of the base portion on a side opposed to the rotor core,
   the plurality of projecting portions each have a tapered portion on an inner periphery thereof and are arranged at intervals on the first surface,
   the sensor magnet includes positioning pins,
   the rotor core has positioning holes into which the positioning pins are inserted,
   the positioning holes pass through the rotor core from the one end to the other end of the rotor core, and
   the positioning pins are provided on the projecting portions of the sensor magnet.

2. The rotor for an IPM motor of claim 1, wherein the number of the projecting portions is equal to the number of the permanent magnets.

3. The rotor for an IPM motor of claim 1, wherein the sensor magnet has three or more positioning pins.

4. The rotor for the IPM motor of claim 3, wherein the positioning pins are arranged in an asymmetrical manner.

5. A rotor of the IPM motor of claim 3, wherein recessed portions are formed between the plurality of the projecting portions of the sensor magnet.

6. The rotor of the IPM motor of claim 5, wherein distal ends of the projecting portions of the sensor magnet abut the rotor core and a flow passage of the resin is formed between the recessed portion and the rotor core.

7. The rotor of the IPM motor of claim 6, wherein the number of the positioning holes of the rotor core is equal to or larger than the number of the positioning pins of the sensor magnet.

8. The rotor of the IPM motor of claim 7, wherein the positioning holes are arranged in correspondence with the taper portions of the projecting portions.

9. An IPM motor, comprising:
   the rotor for the IPM motor of claim 1; and
   a stator arranged to cover an outer periphery of the rotor while being apart from the rotor with a preset clearance.

10. A method of manufacturing the rotor for the IPM motor of claim 1, comprising:
    arranging the rotor core and the sensor magnet in a mold having an injection port;
    injecting a resin in a liquid state through the injection port and curing the resin; and
    fixing the sensor magnet to the rotor core through resin sealing of the sensor magnet at one end of the rotor core.

* * * * *